UNITED STATES PATENT OFFICE.

KONRAD DELBRÜCK, OF ELBERFELD, HUGO KÖHLER, OF LEVERKUSEN, NEAR COLOGNE, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS FOR THE PRODUCTION OF HYDROCARBONS OF THE ERYTHRENE SERIES.

1,179,408. Specification of Letters Patent. Patented Apr. 18, 1916.

No Drawing. Application filed December 6, 1912. Serial No. 735,282.

*To all whom it may concern:*

Be it known that we, KONRAD DELBRÜCK, HUGO KÖHLER, and KURT MEISENBURG, doctors of philosophy, chemists, citizens of the German Empire, residing, respectively, at Elberfeld, Leverkusen, near Cologne, and Elberfeld, Germany, have invented new and useful Improvements in Processes for the Production of Hydrocarbons of the Erythrene Series, of which the following is a specification.

We have found that the technically very valuable hydrocarbons of the erythrene series, such as isoprene (beta-methyl erythrene), alpha-methylerythrene, alpha-alpha-dimethylerythrene, etc., which hydrocarbons containing the characteristic nucleus graphically represented:

$$C=C-C=C$$

can be obtained in a very simple manner by treating 1.3-glycols containing the characteristic nucleus

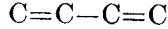

with a dehydrating agent, such as sulfuric acid, sulfonic acids or their acid or neutral salts, phosphoric acid, aluminium chlorid, metal salts, etc.

In order to illustrate the new process more fully the following example is given: 1.3-butandiol is heated in a suitable apparatus in such a way that the vapors pass through a tube filled with magnesium sulfate which is heated to 300°–400° C. The gases escaping after this treatment contain considerable quantities of erythrene which are isolated from the mixture by physical or chemical methods.

From beta-methylbutane-1.3-diol piperylene and from alpha-alpha-dimethylbutane-1.3-diol alpha-alpha-dimethylerythrene is obtained.

We claim:—

1. The process of producing a hydrocarbon of the erythrene series which comprises bringing a glycol having at least four carbon atoms and having the nucleus

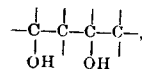

into contact with heated magnesium sulfate, substantially as described.

2. The process of producing a hydrocarbon of the erythrene series which comprises bringing a glycol having at least four carbon atoms and having the nucleus

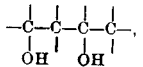

into contact with magnesium sulfate heated to from 300° to 400° C. substantially as described.

3. The process of producing erythrene which comprises passing the vapors of 1.3-butandiol over heated magnesium sulfate, substantially as described.

4. The process of producing erythrene which comprises passing the vapors of 1.3-butandiol over magnesium sulfate heated to from 300° to 400° C. substantially as described.

In testimony whereof we have hereunto set our hands in the presence of two subscribing witnesses.

KONRAD DELBRÜCK. [L.S.]
HUGO KÖHLER. [L.S.]
KURT MEISENBURG. [L.S.]

Witnesses:
HELEN NUFER,
ALBERT NUFER.

It is hereby certified that in Letters Patent No. 1,179,408, granted April 18, 1916, upon the application of Konrad Delbrück, of Elberfeld, Hugo Köhler, of Leverkusen, near Cologne, and Kurt Meisenburg, of Elberfeld, Germany, for an improvement in "Processes for the Production of Hydrocarbons of the Erythrene Series," errors appear in the printed specification requiring correction as follows: Line 14, after the word "as" insert the word and comma *erythrene,;* lines 41-42, for the word "piperylene" read *isoprene;* and that the said Letters Patent should be read with these corrections therein that the same may conform to the record of the case in the Patent Office.

Signed and sealed this 23d day of May, A. D., 1916.

[SEAL.]

J. T. NEWTON,

*Acting Commissioner of Patents.*

Cl. 23—24.